US011930578B2

(12) United States Patent
Peng

(10) Patent No.: US 11,930,578 B2
(45) Date of Patent: Mar. 12, 2024

(54) POWER LINE CARRYING SIGNAL PIXEL CONTROL LIGHT EMITTING DIODE SYSTEM

(71) Applicant: SEMISILICON TECHNOLOGY CORP., New Taipei (TW)

(72) Inventor: Wen-Chi Peng, New Taipei (TW)

(73) Assignee: SEMISILICON TECHNOLOGY CORP., New Taipei (TW)

( * ) Notice: Subject to any disclaimer, the term of this patent is extended or adjusted under 35 U.S.C. 154(b) by 0 days.

(21) Appl. No.: 17/883,220

(22) Filed: Aug. 8, 2022

(65) Prior Publication Data

US 2024/0049376 A1 Feb. 8, 2024

(51) Int. Cl.
*H05B 47/185* (2020.01)

(52) U.S. Cl.
CPC .................................. *H05B 47/185* (2020.01)

(58) Field of Classification Search
CPC .................................................... H05B 47/185
See application file for complete search history.

(56) References Cited

U.S. PATENT DOCUMENTS

2009/0195063 A1* 8/2009 Joseph ................. H05B 47/185 307/1
2011/0109228 A1* 5/2011 Shimomura ........... H05B 45/37 315/185 R
2012/0081015 A1* 4/2012 Shimomura ......... H05B 47/175 315/188
2013/0334980 A1* 12/2013 Zhou .................... H05B 47/185 315/250
2016/0143103 A1* 5/2016 Kang ................... H05B 47/175 315/210
2021/0227672 A1* 7/2021 Takacs ................. H05B 45/355

* cited by examiner

*Primary Examiner* — Minh D A
(74) *Attorney, Agent, or Firm* — MUNCY, GEISSLER, OLDS & LOWE, P.C.

(57) ABSTRACT

A power line carrying signal pixel control light emitting diode system includes a micro-control circuit, an alternating-current power detector and a plurality of light emitting diode lamps. The micro-control circuit includes a first switch and a micro-control module. When the light emitting diode lamps are required to be controlled to light, the micro-control module detects a voltage status of an alternating-current power through the alternating-current power detector. The micro-control module continuously switches a conduction status of the first switch within a half-wave cycle along a voltage change of the alternating-current power to change a voltage transmitted to the light emitting diode lamps to generate a plurality of lighting control signals. The light emitting diode lamps are configured to receive the lighting control signals and light based on the lighting control signals.

12 Claims, 8 Drawing Sheets

POWER LINE CARRYING SIGNAL PIXEL CONTROL LIGHT EMITTING DIODE SYSTEM

BACKGROUND OF THE DISCLOSURE

Technical Field

The present disclosure relates to a light emitting diode system, and especially relates to a power line carrying signal pixel control light emitting diode system.

Description of Related Art

A related art light emitting diode system mainly includes a related art micro-control circuit and a plurality of related art light emitting diode lamps. The related art light emitting diode lamps receive a power supplied by a power supply through a plurality of power wires, and receive a lighting data supplied by the related art micro-control circuit through a plurality of control wires. After each of the related art light emitting diode lamps receives the power supplied by the power supply and the lighting data supplied by the related art micro-control circuit, each of the related art light emitting diode lamps lights based on the lighting data.

However, now that the price of raw materials is increasing day by day, if the related art light emitting diode system includes more related art light emitting diode lamps, the related art light emitting diode system needs more control wires, which undoubtedly increases the cost of the related art light emitting diode system.

SUMMARY OF THE DISCLOSURE

In order to solve the above-mentioned problems, an object of the present disclosure is to provide a power line carrying signal pixel control light emitting diode system.

In order to achieve the object of the present disclosure mentioned above, the power line carrying signal pixel control light emitting diode system of the present disclosure is applied to an alternating-current power. The power line carrying signal pixel control light emitting diode system includes a micro-control circuit, an alternating-current power detector and a plurality of light emitting diode lamps. The alternating-current power detector is electrically connected to the micro-control circuit. The light emitting diode lamps are electrically connected to the micro-control circuit and the alternating-current power detector, and receive the alternating-current power as a working power. Moreover, the micro-control circuit includes a first switch and a micro-control module. The first switch is electrically connected to the light emitting diode lamps. The micro-control module is electrically connected to the alternating-current power detector and the first switch. Moreover, when the light emitting diode lamps are required to be controlled to light, the micro-control module detects a voltage status of the alternating-current power through the alternating-current power detector. The micro-control module continuously switches a conduction status of the first switch within a half-wave cycle along a voltage change of the alternating-current power to change a voltage transmitted to the light emitting diode lamps to generate a plurality of lighting control signals. The light emitting diode lamps are configured to receive the lighting control signals and light based on the lighting control signals.

The advantage of the present disclosure is to omit control wires of the light emitting diode system to save wires and costs.

Please refer to the detailed descriptions and figures of the present disclosure mentioned below for further understanding the technology, method and effect of the present disclosure achieving the predetermined purposes. It believes that the purposes, characteristic and features of the present disclosure can be understood deeply and specifically. However, the figures are only for references and descriptions, but the present disclosure is not limited by the figures.

DETAILED DESCRIPTION

Figure 1:
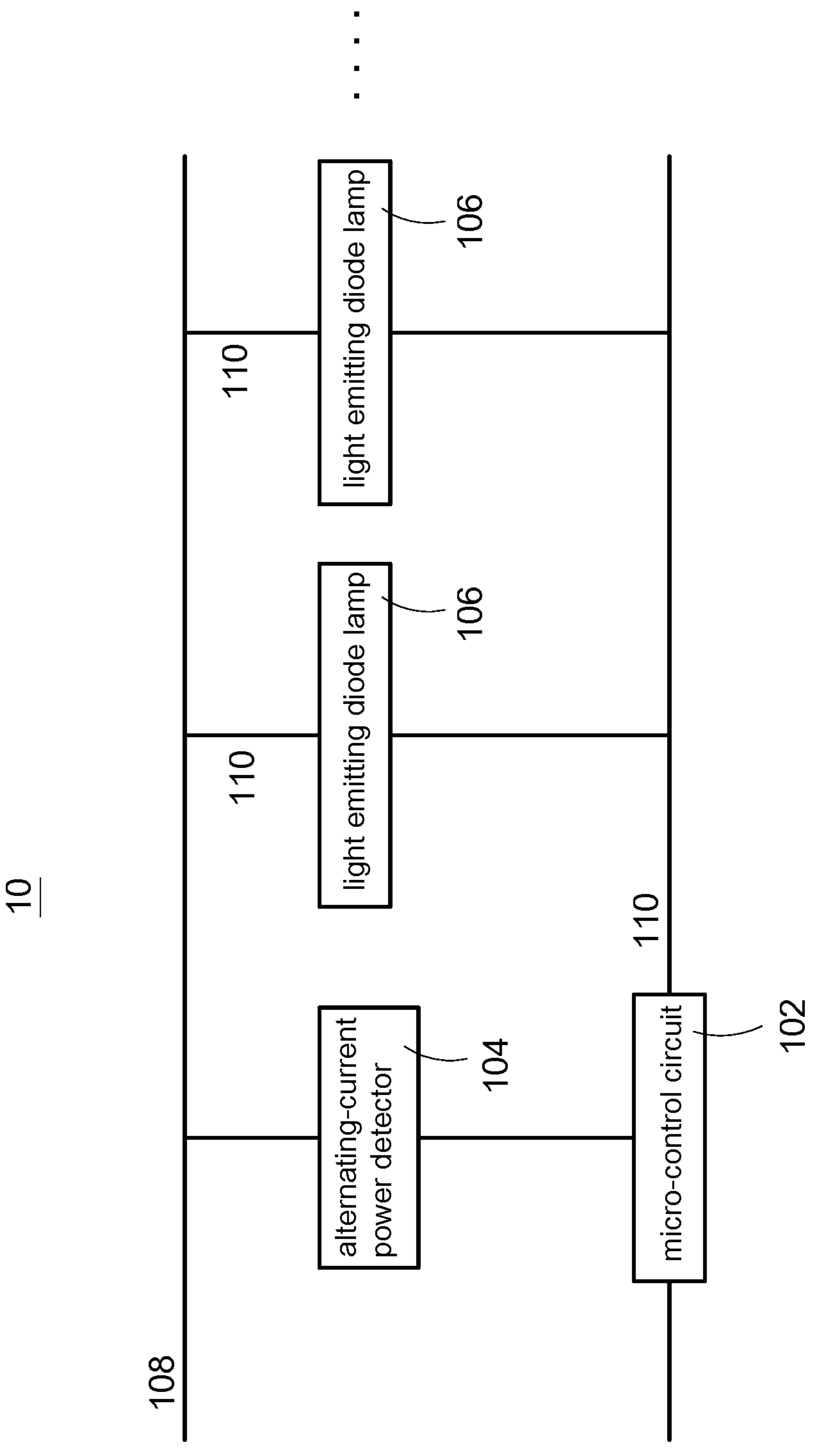
FIG. 1 shows a block diagram of the first embodiment of the power line carrying signal pixel control light emitting diode system of the present disclosure.

In the present disclosure, numerous specific details are provided, to provide a thorough understanding of embodiments of the disclosure. Persons of ordinary skill in the art will recognize, however, that the present disclosure can be practiced without one or more of the specific details. In other instances, well-known details are not shown or described to avoid obscuring aspects of the present disclosure. Now please refer to the figures for the explanation of the technical content and the detailed description of the present disclosure:

FIG. 1 shows a block diagram of the first embodiment of the power line carrying signal pixel control light emitting diode system 10 of the present disclosure. A power line carrying signal pixel control light emitting diode system 10 of the present disclosure is applied to an alternating-current power 108. The power line carrying signal pixel control light emitting diode system 10 includes a micro-control circuit 102, an alternating-current power detector 104 and a plurality of light emitting diode lamps 106. The above components are electrically connected to each other. The light emitting diode lamps 106 receive the alternating-current power 108 as a working power. The light emitting diode lamps 106 are configured to receive a plurality of lighting control signals 110 and are configured to light (namely, the light emitting diode lamps 106 are driven by the lighting control signals 110 to light diversely, which will be described in detail later) based on the lighting control signals 110. The alternating-current power 108 is, for example but not limited to, a 120 volts alternating-current power. The light emitting diode lamps 106 are connected to each other in parallel.

Figure 2:
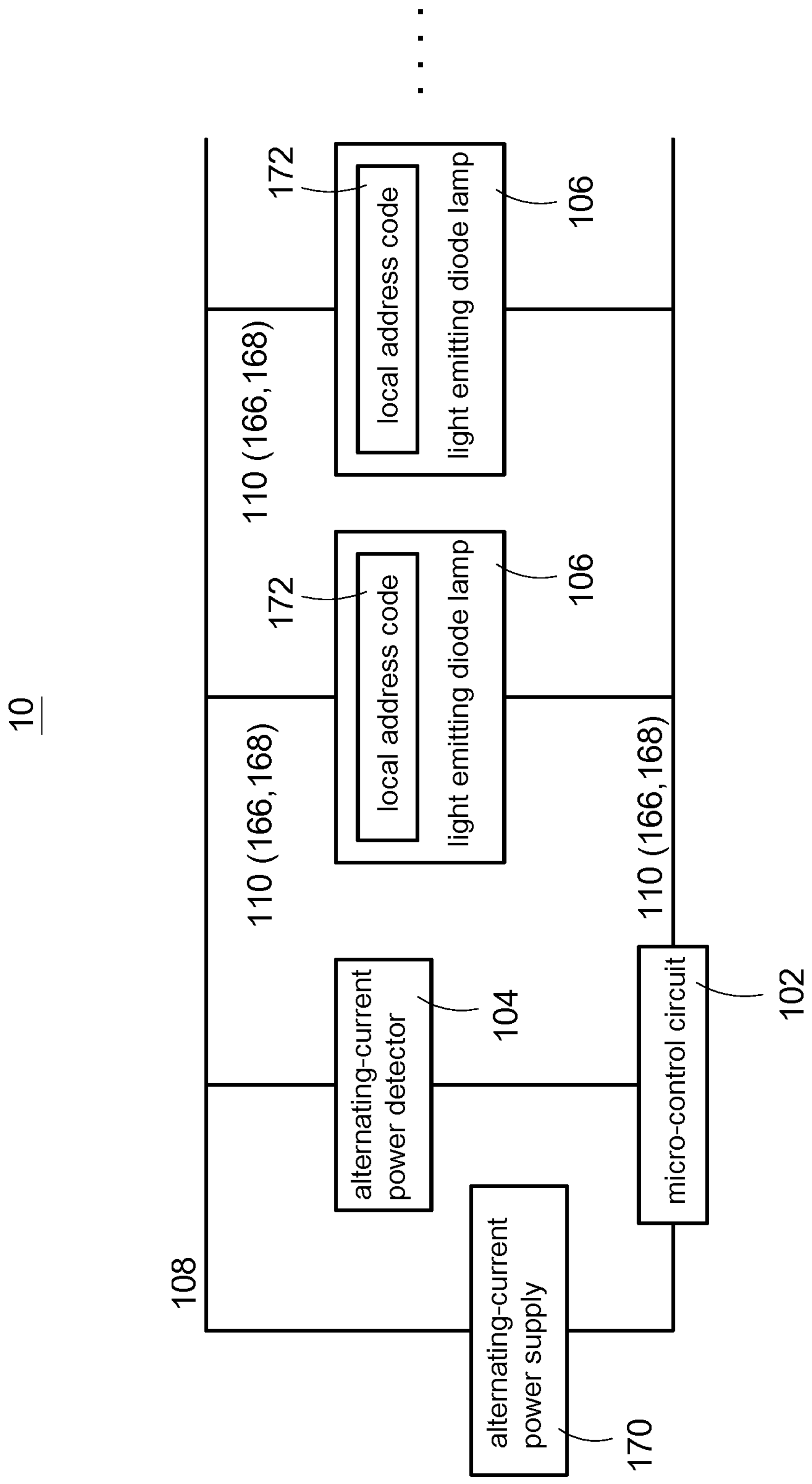
FIG. 2 shows a block diagram of the second embodiment of the power line carrying signal pixel control light emitting diode system of the present disclosure.

Moreover, FIG. 2 shows a block diagram of the second embodiment of the power line carrying signal pixel control light emitting diode system 10 of the present disclosure. The descriptions of the elements shown in FIG. 2 which are the same as the elements shown in FIG. 1 are not repeated here for brevity. The power line carrying signal pixel control light emitting diode system 10 further includes an alternating-current power supply 170 electrically connected to the micro-control circuit 102, the alternating-current power detector 104 and the light emitting diode lamps 106. The alternating-current power supply 170 is used to generate and output the alternating-current power 108. Each of the light emitting diode lamps 106 includes a local address code 172. The lighting control signal 110 includes an address data 166 and a lighting data 168. When each of the light emitting diode lamps 106 receives the lighting control signals 110, each of the light emitting diode lamps 106 is configured to compare the address data 166 with the local address code 172. If the address data 166 is equal to the local address code 172, the light emitting diode lamp 106 is configured to light based on the lighting data 168. If the address data 166 is not equal to the local address code 172, the light emitting diode lamp 106 is configured to ignore the lighting data 168.

Figure 3:
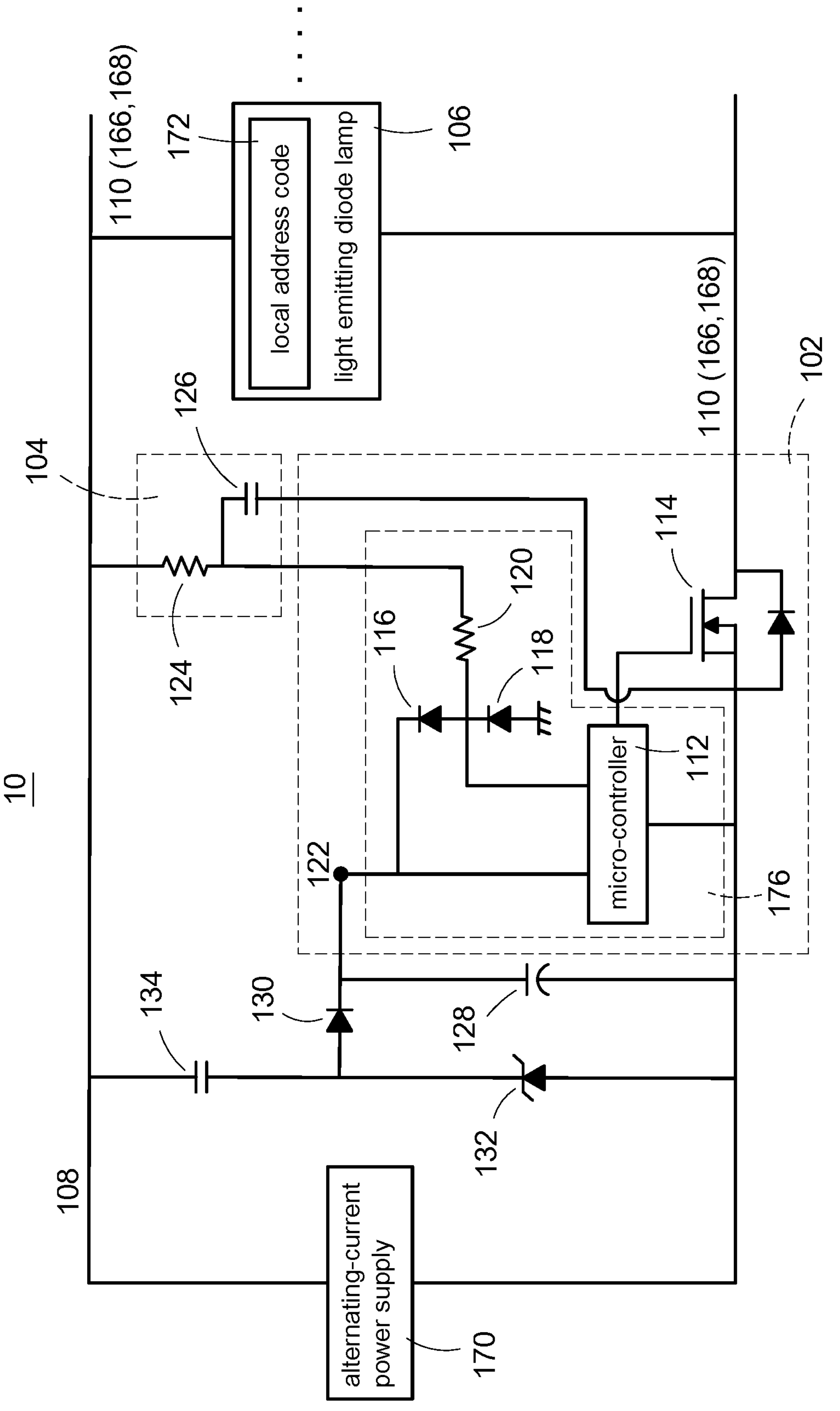
FIG. 3 shows a circuit diagram of an embodiment of the micro-control circuit and the alternating-current power detector of the second embodiment of the power line carrying signal pixel control light emitting diode system of the present disclosure.

FIG. 3 shows a circuit diagram of an embodiment of the micro-control circuit 102 and the alternating-current power detector 104 of the second embodiment of the power line carrying signal pixel control light emitting diode system 10 of the present disclosure. The descriptions of the elements shown in FIG. 3 which are the same as the elements shown in FIG. 2 are not repeated here for brevity. The power line carrying signal pixel control light emitting diode system 10 further includes a first capacitor 128, a rectifying diode 130, a clamping Zener diode 132 and a second capacitor 134. The micro-control circuit 102 includes a first switch 114, a micro-control module 176 and a micro-controller working voltage source 122. The micro-control module 176 includes a micro-controller 112, a first clamping diode 116, a second clamping diode 118 and a resistor 120. The alternating-current power detector 104 includes a detecting resistor 124 and a detecting capacitor 126. The above components are electrically connected to each other. Moreover, the type of the micro-controller 112 of FIG. 3 is, for example but not limited to, DJ6244 or DJ6246, or any micro-controller that can achieve the same function.

When the light emitting diode lamps 106 are required to be controlled to light, the micro-control module 176 detects a voltage status of the alternating-current power 108 through the alternating-current power detector 104. The micro-control module 176 continuously switches a conduction status of the first switch 114 within a half-wave cycle along a voltage change of the alternating-current power 108 to change a voltage transmitted to the light emitting diode lamps 106 to generate the lighting control signals 110.

The micro-control module 176 detects the voltage status of the alternating-current power 108 through the detecting resistor 124 and the detecting capacitor 126. The first clamping diode 116 and the second clamping diode 118 clamp the alternating-current power 108 to obtain a first square wave signal and transmit the first square wave signal to the micro-controller 112, so that the micro-controller 112 determines and detects the voltage status of the alternating-current power 108.

A signal strength of the lighting control signals 110 is sufficient for the light emitting diode lamps 106 to recognize and is greater than a reset voltage of the light emitting diode lamps 106. Here, the significance of the signal strength of the lighting control signals 110 being strong enough is that: firstly, the potential difference (for example, 2~3 volts) is high enough to allow the light emitting diode lamps 106 to recognize the lighting control signals 110; if the potential difference is too small, the light emitting diode lamps 106 cannot recognize the lighting control signals 110; secondly, a minimum voltage value of the signal strength of the lighting control signals 110 is greater than the reset voltage of the light emitting diode lamps 106, thus preventing the light emitting diode lamps 106 from resetting.

Figure 6:
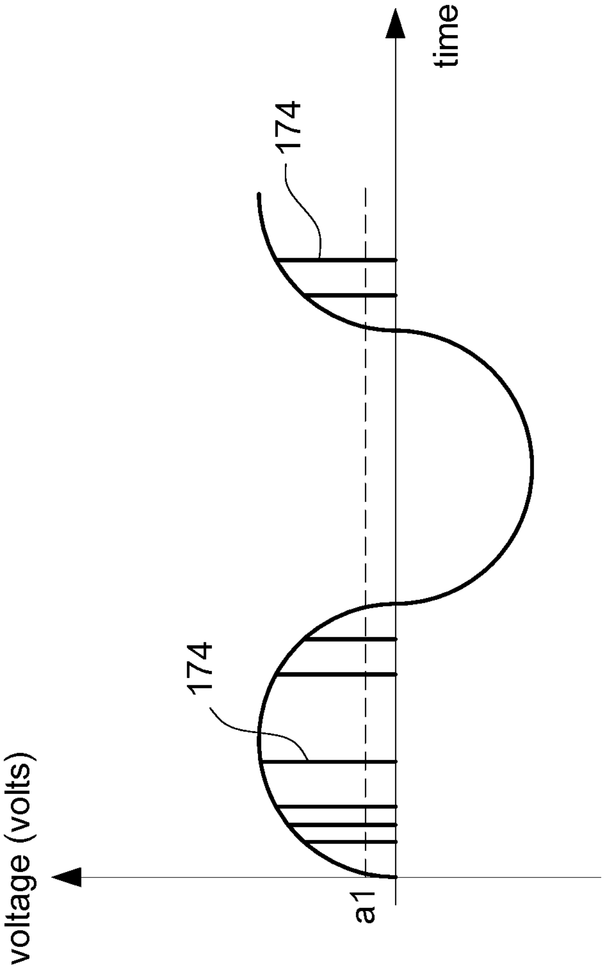
FIG. 6 shows a waveform diagram of an embodiment of the lighting control signals generated by using the first switch of FIG. 3.

FIG. 6 shows a waveform diagram of an embodiment of the lighting control signals 110 generated by using the first switch 114 of FIG. 3. A predetermined value al (namely, the signal strength of the lighting control signals 110 being strong enough mentioned above) shown in FIG. 6 may be a working voltage value of the light emitting diode lamps 106. The lighting control signals 110 include a plurality of pulse signals 174. If a signal length of the lighting control signals 110 is greater than the half-wave cycle, the micro-control module 176 switches the first switch 114 in a next half-wave cycle having the same alternating-current power voltage change to complete generating the lighting control signals 110. Here, the signal length is defined as the signal length of all the lighting control signals 110 (namely, all the pulse signals 174). Furthermore, the present disclosure can also be applied to an alternating-current power which is already rectified, so that there is no need to wait for an interval of a half-wave cycle.

Figure 4:
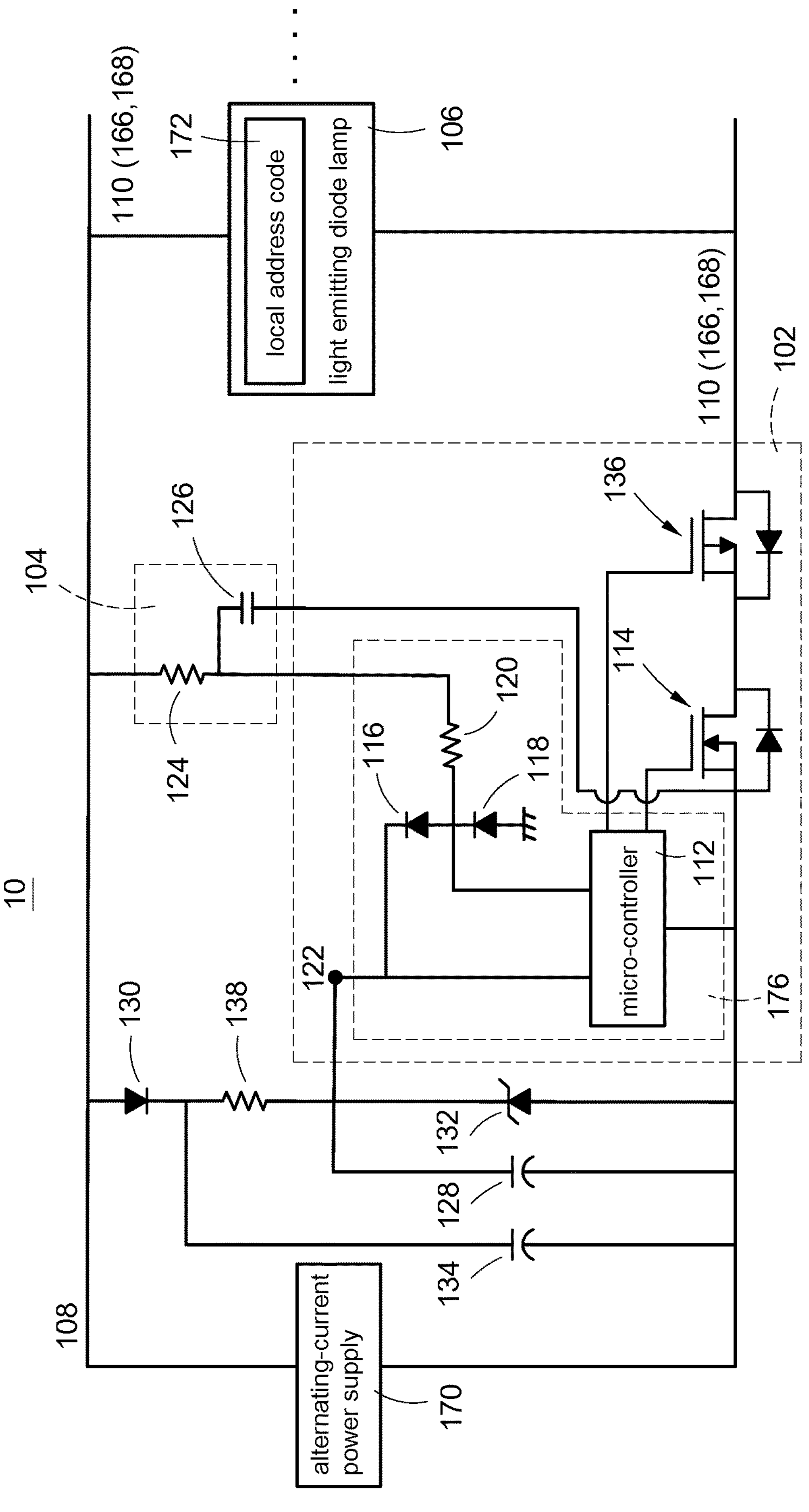
FIG. 4 shows a circuit diagram of another embodiment of the micro-control circuit and the alternating-current power detector of the second embodiment of the power line carrying signal pixel control light emitting diode system of the present disclosure.

FIG. 4 shows a circuit diagram of another embodiment of the micro-control circuit 102 and the alternating-current power detector 104 of the second embodiment of the power line carrying signal pixel control light emitting diode system 10 of the present disclosure. The descriptions of the elements shown in FIG. 4 which are the same as the elements shown in FIG. 3 are not repeated here for brevity. The power line carrying signal pixel control light emitting diode system 10 further includes a first capacitor 128, a rectifying diode 130, a clamping Zener diode 132, a second capacitor 134 and a voltage-dividing resistor 138. The micro-control circuit 102 further includes a second switch 136. The above components are electrically connected to each other. Moreover, a type of the micro-controller 112 of FIG. 4 is, for example but not limited to, DJ6374, or any micro-controller that can achieve the same function. The clamping Zener diode 132 is used to clamp the alternating-current power 108 to supply a power to the micro-controller 112.

The micro-control module 176 continuously switches the conduction status of the first switch 114 or a conduction status of the second switch 136 within a full-wave cycle along the voltage change of the alternating-current power 108 to change the voltage transmitted to the light emitting diode lamps 106 to generate the lighting control signals 110. The first switch 114 is connected to the second switch 136 in series. When the alternating-current power 108 is in a positive half cycle, the micro-control module 176 switches the first switch 114 to generate the lighting control signals 110. When the alternating-current power 108 is in a negative half cycle, the micro-control module 176 switches the second switch 136 to generate the lighting control signals 110.

Figure 7:
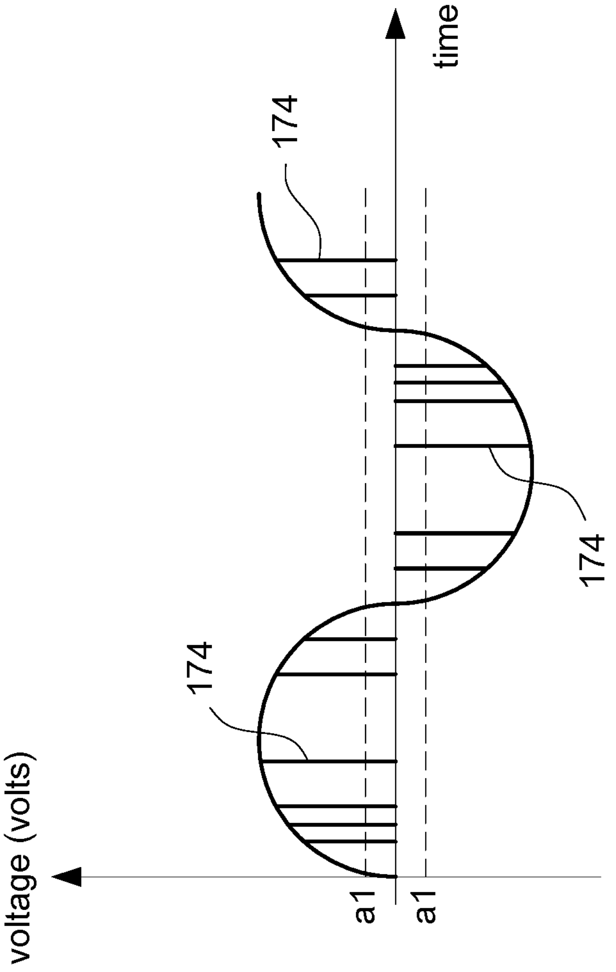
FIG. 7 shows a waveform diagram of an embodiment of the lighting control signals generated by using the first switch and the second switch of FIG. 4.

FIG. 7 shows a waveform diagram of an embodiment of the lighting control signals 110 generated by using the first switch 114 and the second switch 116 of FIG. 4. If the signal length of the lighting control signals 110 is greater than the half-wave cycle, the micro-control module 176 switches the first switch 114 or the second switch 136 in a next half-wave cycle to complete generating the lighting control signals 110; namely, it is for a switching of the positive half cycle and the negative half cycle (the voltage changes are different); the micro-control module 176 firstly switches the first switch 114 and then switches the second switch 136 to complete generating the lighting control signals 110; when one of the first switch 114 and the second switch 136 is switched, the other of the first switch 114 and the second switch 136 stops switching.

Moreover, in FIG. 3 and FIG. 4, the micro-controller working voltage source 122 is connected to the micro-controller 112 and a cathode of the first clamping diode 116. An anode of the first clamping diode 116 is connected to the micro-controller 112, a cathode of the second clamping diode 118 and one side of the resistor 120. An anode of the second clamping diode 118 is connected to a ground. The other side of the resistor 120 is connected to the alternating-current power detector 104. The detecting resistor 124 is, for example but not limited to, a 1M ohms resistor or a 2M ohms resistor. The alternating-current power detector 104 may not necessarily include the detecting capacitor 126. The first capacitor 128 is, for example but not limited to, a 10 uF capacitor. The clamping Zener diode 132 is, for example but not limited to, a 5.1 volts Zener diode. A type of the rectifying diode 130 of FIG. 3 is, for example but not limited to, 1N4148. A type of the rectifying diode 130 of FIG. 4 is, for example but not limited to, 1N4007. The second capacitor 134 of FIG. 3 is, for example but not limited to, a 0.68 uF/250 volts capacitor. The second capacitor 134 of FIG. 4 is, for example but not limited to, a 47 uF capacitor.

Figure 5:
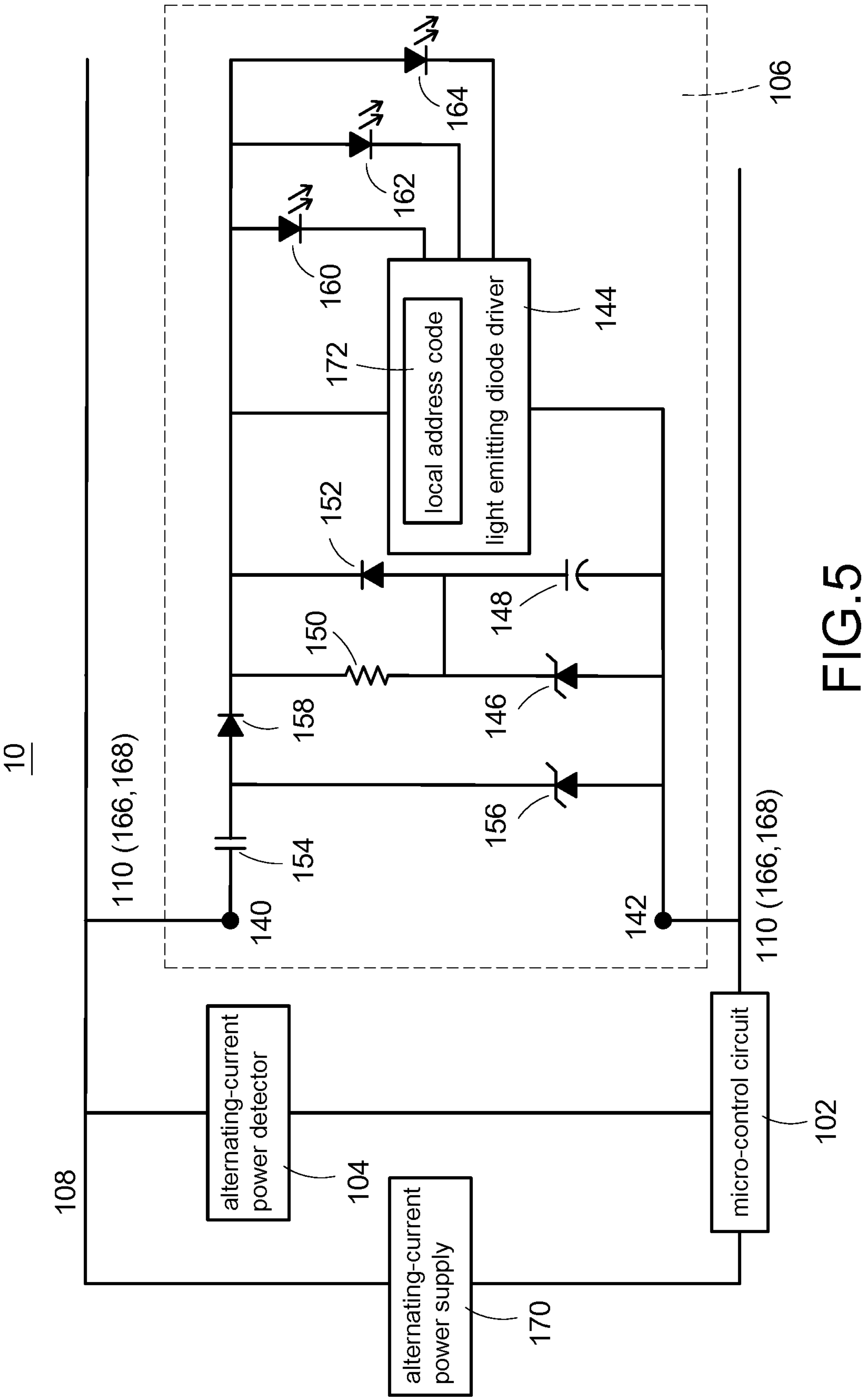
FIG. 5 shows a circuit diagram of the light emitting diode lamp of the present disclosure.

FIG. 5 shows a circuit diagram of the light emitting diode lamp 106 of the present disclosure. The descriptions of the elements shown in FIG. 5 which are the same as the elements shown in FIG. 2 are not repeated here for brevity. Each of the light emitting diode lamps 106 includes a voltage positive point 140, a voltage negative point 142, a light emitting diode driver 144, a first Zener diode 146, a third capacitor 148, a lamp side resistor 150, a first diode 152, a fourth capacitor 154, a second Zener diode 156, a second diode 158, a red light emitting diode 160, a green light emitting diode 162 and a blue light emitting diode 164. The above components are electrically connected to each other. A type of the light emitting diode driver 144 of FIG. 5 is, for example but not limited to, DJ5179 or ST2599A, or any light emitting diode driver that can achieve the same function.

Figure 8:
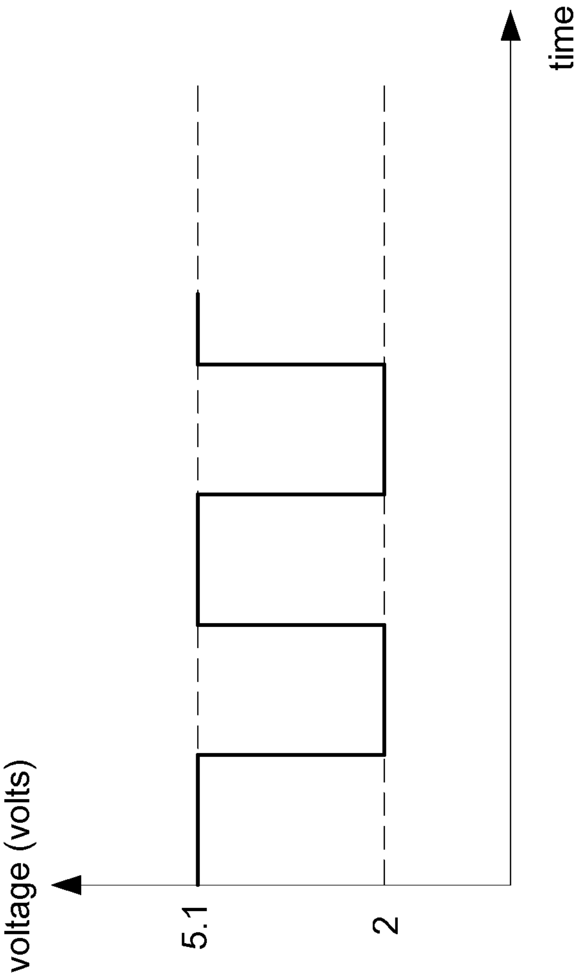
FIG. 8 shows a waveform diagram of an embodiment of the lighting control signals of the present disclosure processed by the light emitting diode lamp.

The first Zener diode 146, the third capacitor 148, the lamp side resistor 150, the first diode 152, the fourth capacitor 154, the second Zener diode 156 and the second diode 158 process the lighting control signals 110 to obtain a second square wave signal. The second square wave signal is between a first breakdown voltage (for example, 2 volts) of the first Zener diode 146 and a second breakdown voltage (for example, 5.1 volts) of the second Zener diode 156. FIG. 8 shows a waveform (namely, the second square wave signal) diagram of an embodiment of the lighting control signals 110 of the present disclosure processed by the light emitting diode lamp 106.

Moreover, the light emitting diode driver 144 is configured to store the local address code 172. The first Zener diode 146 is, for example but not limited to, a 2 volts Zener diode. The third capacitor 148 is, for example but not limited to, a 10 uF capacitor. A type of the first diode 152 is, for example but not limited to, 1N4148. The fourth capacitor 154 is, for example but not limited to, a 0.68 uF/250 volts capacitor. The second Zener diode 156 is, for example but not limited to, a 5.1 volts Zener diode. A type of the second diode 158 is, for example but not limited to, 1N4148.

Moreover, the voltage negative point 142 is connected to the light emitting diode driver 144, an anode of the first Zener diode 146, one side of the third capacitor 148 and an anode of the second Zener diode 156. The voltage positive point 140 is connected to one side of the fourth capacitor 154. The other side of the fourth capacitor 154 is connected to a cathode of the second Zener diode 156 and an anode of the second diode 158. A cathode of the second diode 158 is connected to the light emitting diode driver 144, one side of the lamp side resistor 150, a cathode of the first diode 152, an anode of the red light emitting diode 160, an anode of the green light emitting diode 162 and an anode of the blue light emitting diode 164. The other side of the lamp side resistor 150 is connected to a cathode of the first Zener diode 146, the other side of the third capacitor 148 and an anode of the first diode 152. A cathode of the red light emitting diode 160, a cathode of the green light emitting diode 162 and a cathode of the blue light emitting diode 164 are connected to the light emitting diode driver 144.

The advantage of the present disclosure is to omit control wires of the light emitting diode system to save wires and costs.

Although the present disclosure has been described with reference to the embodiment thereof, it will be understood that the disclosure is not limited to the details thereof. Various substitutions and modifications have been suggested in the foregoing description, and others will occur to those of ordinary skill in the art. Therefore, all such substitutions and modifications are intended to be embraced within the scope of the disclosure as defined in the appended claims.

What is claimed is:

1. A power line carrying signal pixel control light emitting diode system applied to an alternating-current power, the power line carrying signal pixel control light emitting diode system comprising:

a micro-control circuit;

an alternating-current power detector electrically connected to the micro-control circuit; and a plurality of light emitting diode lamps electrically connected to the micro-control circuit and the alternating-current power detector, and receiving the alternating-current power as a working power, wherein the micro-control circuit comprises:

a first switch electrically connected to the light emitting diode lamps; and a micro-control module electrically connected to the alternating-current power detector and the first switch, wherein when the light emitting diode lamps are required to be controlled to light, the micro-control module detects a voltage status of the alternating-current power through the alternating-current power detector; the micro-control module continuously switches a conduction status of the first switch within a half-wave cycle along a voltage change of the alternating-current power to change a voltage transmitted to the light emitting diode lamps to generate a plurality of lighting control signals; the light emitting diode lamps are configured to receive the lighting control signals and light based on the lighting control signals, wherein the micro-control module comprises:

a micro-controller electrically connected to the first switch;

a first clamping diode electrically connected to the micro-controller;

a second clamping diode electrically connected to the micro-controller and the first clamping diode; and a resistor electrically connected to the micro-controller, the first clamping diode and the second clamping diode, wherein the first clamping diode and the second clamping diode clamp the alternating-current power to obtain a first square wave signal and transmit the first square wave signal to the micro-controller, so that the micro-controller determines and detects the voltage status of the alternating-current power, and wherein the micro-control circuit further comprises:

a micro-controller working voltage source electrically connected to the micro-controller and the first clamping diode.

2. The power line carrying signal pixel control light emitting diode system of claim 1, wherein a signal strength of the lighting control signals is sufficient for the light emitting diode lamps to recognize and is greater than a reset voltage of the light emitting diode lamps.

3. The power line carrying signal pixel control light emitting diode system of claim 1, wherein the alternating-current power detector comprises:

a detecting resistor electrically connected to the micro-control module and the light emitting diode lamps; and a detecting capacitor electrically connected to the micro-control module, the detecting resistor and the first switch, wherein the micro-control module detects the voltage status of the alternating-current power through the detecting resistor and the detecting capacitor.

4. The power line carrying signal pixel control light emitting diode system of claim 3, further comprising:

a first capacitor electrically connected to the micro-controller working voltage source, the detecting capacitor, the micro-controller and the first switch;

a rectifying diode electrically connected to the micro-controller working voltage source and the first capacitor;

a clamping zener diode electrically connected to the detecting capacitor, the micro-controller, the first switch, the first capacitor and the rectifying diode; and a second capacitor electrically connected to the detecting resistor, the light emitting diode lamps, the rectifying diode and the clamping zener diode.

5. The power line carrying signal pixel control light emitting diode system of claim 3, wherein the micro-control circuit further comprises:

a second switch electrically connected to the light emitting diode lamps, the micro-controller and the first switch, wherein the micro-control module continuously switches the conduction status of the first switch or a conduction status of the second switch within a full-wave cycle along the voltage change of the alternating-current power to change the voltage transmitted to the light emitting diode lamps to generate the lighting control signals.

6. The power line carrying signal pixel control light emitting diode system of claim 5, further comprising:

a first capacitor electrically connected to the micro-controller working voltage source, the detecting capacitor, the micro-controller and the first switch;

a rectifying diode electrically connected to the detecting resistor and the light emitting diode lamps;

a clamping zener diode electrically connected to the micro-controller working voltage source, the detecting capacitor, the micro-controller, the first switch and the first capacitor;

a second capacitor electrically connected to the detecting capacitor, the micro-controller, the first switch, the first capacitor, the rectifying diode and the clamping zener diode; and a voltage-dividing resistor electrically connected to the micro-controller working voltage source, the first capacitor, the rectifying diode, the clamping zener diode and the second capacitor, wherein the clamping zener diode is used to clamp the alternating-current power to supply a power to the micro-controller.

7. The power line carrying signal pixel control light emitting diode system of claim 5, wherein if a signal length of the lighting control signals is greater than the half-wave cycle, the micro-control module switches the first switch or the second switch in a next half-wave cycle to complete generating the lighting control signals.

8. The power line carrying signal pixel control light emitting diode system of claim 7, wherein the micro-control module firstly switches the first switch and then switches the second switch to complete generating the lighting control signals; when one of the first switch and the second switch is switched, the other of the first switch and the second switch stops switching.

9. The power line carrying signal pixel control light emitting diode system of claim 5, wherein the first switch is connected to the second switch in series; when the alternating-current power is in a positive half cycle, the micro-control module switches the first switch to generate the lighting control signals; when the alternating-current power is in a negative half cycle, the micro-control module switches the second switch to generate the lighting control signals.

10. The power line carrying signal pixel control light emitting diode system of claim 1, wherein if a signal length of the lighting control signals is greater than the half-wave cycle, the micro-control module switches the first switch in a next half-wave cycle having the same alternating-current power voltage change to complete generating the lighting control signals.

11. A power line carrying signal pixel control light emitting diode system applied to an alternating-current power, the power line carrying signal pixel control light emitting diode system comprising:

a micro-control circuit;

an alternating-current power detector electrically connected to the micro-control circuit; and a plurality of light emitting diode lamps electrically connected to the micro-control circuit and the alternating-current power detector, and receiving the alternating-current power as a working power, wherein the micro-control circuit comprises:

a first switch electrically connected to the light emitting diode lamps; and a micro-control module electrically connected to the alternating-current power detector and the first switch, wherein when the light emitting diode lamps are required to be controlled to light, the micro-control module detects a voltage status of the alternating-current power through the alternating-current power detector; the micro-control module continuously switches a conduction status of the first switch within a half-wave cycle along a voltage change of the alternating-current power to change a voltage transmitted to the light emitting diode lamps to generate a plurality of lighting control signals; the light emitting diode lamps are configured to receive the lighting control signals and light based on the lighting control signals, wherein each of the light emitting diode lamps comprises:

a voltage positive point electrically connected to the alternating-current power detector;

a voltage negative point electrically connected to the micro-control circuit;

a light emitting diode driver electrically connected to the voltage negative point;

a first zener diode electrically connected to the voltage negative point and the light emitting diode driver;

a third capacitor electrically connected to the voltage negative point, the light emitting diode driver and the first zener diode;

a lamp side resistor electrically connected to the light emitting diode driver, the first zener diode and the third capacitor;

a first diode electrically connected to the light emitting diode driver, the first zener diode, the third capacitor and the lamp side resistor;

a fourth capacitor electrically connected to the voltage positive point;

a second zener diode electrically connected to the voltage negative point, the light emitting diode driver, the first zener diode, the third capacitor and the fourth capacitor; and a second diode electrically connected to the light emitting diode driver, the lamp side resistor, the first diode, the fourth capacitor and the second zener diode, wherein the first zener diode, the third capacitor, the lamp side resistor, the first diode, the fourth capacitor, the second zener diode and the second diode process the lighting control signals to obtain a second square wave signal; the second square wave signal is between a first breakdown voltage of the first zener diode and a second breakdown voltage of the second zener diode.

12. The power line carrying signal pixel control light emitting diode system of claim 11, wherein each of the light emitting diode lamps further comprises:

a red light emitting diode electrically connected to the light emitting diode driver, the lamp side resistor, the first diode and the second diode;

a green light emitting diode electrically connected to the light emitting diode driver, the lamp side resistor, the first diode, the second diode and the red light emitting diode; and a blue light emitting diode electrically connected to the light emitting diode driver, the lamp side resistor, the first diode, the second diode, the red light emitting diode and the green light emitting diode.

* * * * *